(12) United States Patent
Andrushenko et al.

(10) Patent No.: US 7,418,323 B2
(45) Date of Patent: Aug. 26, 2008

(54) METHOD AND SYSTEM FOR AIRCRAFT DATA AND PORTFOLIO MANAGEMENT

(75) Inventors: Walter Andrushenko, Phoenix, AZ (US); Serge Dymkov, Cave Creek, AZ (US)

(73) Assignee: Tag One, Inc.

( * ) Notice: Subject to any disclaimer, the term of this patent is extended or adjusted under 35 U.S.C. 154(b) by 0 days.

(21) Appl. No.: 11/043,320

(22) Filed: Jan. 26, 2005

(65) Prior Publication Data

US 2005/0165524 A1   Jul. 28, 2005

Related U.S. Application Data

(60) Provisional application No. 60/539,883, filed on Jan. 27, 2004.

(51) Int. Cl.
*G06K 9/00* (2006.01)
*H04N 1/00* (2006.01)
*G06F 17/30* (2006.01)

(52) U.S. Cl. .................. 701/35; 701/1; 701/3; 705/67; 705/404; 707/204; 707/104.1

(58) Field of Classification Search ............. 701/3, 701/35, 1, 9, 10, 100, 101, 102, 104.1, 204; 705/1, 2, 36 R, 50, 51.67, 404; 709/217, 709/232; 382/177, 181; 358/462; 707/1, 707/9, 10, 100, 101, 102, 104.1, 204
See application file for complete search history.

(56) References Cited

U.S. PATENT DOCUMENTS

| | | | | |
|---|---|---|---|---|
| 5,664,109 A | * | 9/1997 | Johnson et al. | 705/2 |
| 5,963,966 A | * | 10/1999 | Mitchell et al. | 715/513 |
| 6,044,465 A | * | 3/2000 | Dutcher et al. | 726/13 |
| 6,336,124 B1 | * | 1/2002 | Alam et al. | 715/523 |
| 2001/0032103 A1 | * | 10/2001 | Sinex | 705/4 |
| 2002/0091756 A1 | * | 7/2002 | Goodwin | 709/203 |
| 2002/0095476 A1 | * | 7/2002 | Craik | 709/217 |
| 2002/0169746 A1 | * | 11/2002 | Cowman et al. | 707/1 |
| 2003/0005300 A1 | * | 1/2003 | Noble et al. | 713/172 |
| 2003/0069648 A1 | * | 4/2003 | Douglas et al. | 700/2 |
| 2004/0088313 A1 | * | 5/2004 | Torres | 707/101 |
| 2005/0018237 A1 | * | 1/2005 | Cossel et al. | 358/1.15 |

* cited by examiner

*Primary Examiner*—Tan Q Nguyen
(74) *Attorney, Agent, or Firm*—David W. Barman; Robert M. Schwartz

(57) ABSTRACT

Aircraft data and portfolio management is automated by collecting all of the paper records and scanning them into a virtual portfolio. The scanned records are subjected to optical character recognition so that the text portions of the records become text-searchable. Then the files are organized in a logical directory tree. Access to the files may be had through the Internet or another network, or the data files may be stored and made available on a portable data carrier. The system provides for immediate and convenient access to historical aircraft records and portfolio management tools.

9 Claims, 3 Drawing Sheets

US 7,418,323 B2

METHOD AND SYSTEM FOR AIRCRAFT DATA AND PORTFOLIO MANAGEMENT

CROSS-REFERENCE TO RELATED APPLICATION

This application claims the benefit, under 35 U.S.C. § 119(e) of copending provisional application No. 60/539,883, filed Jan. 27, 2004; the prior application is herewith incorporated by reference in its entirety.

BACKGROUND OF THE INVENTION

Field of the Invention

The invention relates to a method and a system for aircraft data and aircraft portfolio management.

Aircraft require a considerable amount of paperwork to satisfy record-keeping requirements. These include the federally mandated maintenance and safety inspection logs, operation logs, and also financial/legal information. Airlines and aircraft owners are challenged by the burden and expense of document management, distribution and storage. Managing thousands of paper files, a variety of computer systems, and restrictive microfiche archives, can prove costly and demanding.

Proper aircraft documentation is not only mandatory but also necessary. When, for instance, an aircraft changes hands, such as during a regular sale, reorganization out of bankruptcy, or debt refinancing, the entire history of the aircraft must be reviewed in detail. The documentation portfolio includes all maintenance records, operational records, financial records, air worthiness directives (ADs), and operator's logs. In addition, it makes for a good portfolio when visual documentation is available as well, such a pictures of the appearance of the aircraft and charts with the currently installed seating arrangement.

Such records portfolios are extremely voluminous. A portfolio for, say, a 15-year old Boeing 737, typically takes up about 40 boxes of paper files. It is also quite typical for these paper files to be in disarray. Records research is costly and time-consuming. The inspectors often have to track down and then wade through endless filing cabinets and boxes of archival documents. Scattered in and around numerous office locations and storage facilities, many trips are typically involved in gathering these crucial documents with maintenance records mixed among financial records and inspection certificates. When the aircraft is put up for sale or even only when new financing arrangements are sought, the entire file (i.e., 40 boxes with approx. 80,000 pages of records) must be reviewed. This may take two or three records examiners several weeks and the attendant cost is understandably very high. Also, human records inspection is naturally subject to review errors and important data may easily be overlooked. There exists, therefore, a demand for less expensive, faster, and more dependable record-keeping and portfolio inspection.

SUMMARY OF THE INVENTION

It is accordingly an object of the invention to provide a method and system for aircraft data and portfolio management which overcome the disadvantages of the prior art systems and methods of this general type and which provide for data handling ease and simplicity, around-the-clock availability, secure and delegatable access, as well as scalability and adaptability to specific applications.

With the foregoing and other objects in view there is provided, in accordance with the invention, a method of managing aircraft-related records, the method which comprises:

collecting physical data records pertaining to a given aircraft;

scanning the physical data records into a computer system and converting the data into files having a computer-searchable format;

splitting the files and organizing the files in a database system with virtual aircraft records pertaining to the given aircraft; and providing user access to the virtual aircraft records for one or more selected users.

In accordance with an added feature of the invention, the virtual aircraft records are stored on a web server, and a user having permission to access the virtual aircraft records is enabled to gain access through the Internet with a computer running a web browser.

User access can be provided by assigning to the user a login password enabling access through a network with permission tagged to the given aircraft. In an alternative embodiment, user access is provided by copying the virtual aircraft records onto a portable data carrier (a computer-readable medium) with computer-readable files and transferring the portable data carrier to the user.

In accordance with another feature of the invention, the converting step comprises subjecting scanned records to optical character recognition and outputting files in text-searchable format.

In accordance with again an added feature of the invention, pictures and graphical files are entered into the database system and these are made available with reference to the given aircraft upon user request through the network.

With the above and other objects in view there is also provided, in accordance with the invention, a computer-readable medium having stored thereon computer-readable data pertaining to an aircraft records portfolio, comprising:

files containing graphical data of scanned paper records of the records portfolio of a given aircraft for display on a computer screen showing the records in graphical format and having text information of the paper records in text-searchable format; and data files with photographic information related to the given aircraft.

With the above and other objects in view there is also provided, in accordance with the invention, a set of application program interfaces embodied on a computer-readable medium for execution on a computer having an application program for identifying and displaying specific aircraft portfolio information to an authorized person, comprising:

a login interface enabling or denying access to a data set with an aircraft records portfolio of a given aircraft;

a search query interface receiving a set of search attributes;

a search engine matching the set of search attributes with each occurrence of the search attributes in the data set with the aircraft records portfolio, and an interface returning and displaying a list of resulting matches; and a display interface, responsive to a selection by the user from the list of resulting matches, for displaying matching data from the aircraft portfolio in graphical display format.

In accordance with a concomitant feature of the invention, the data set is comprised of text-searchable records generated by scanning paper records and OCRing the scanned paper records.

In its preferred implementation, the novel system is an Internet-based system that streamlines and simplifies aircraft data and portfolio management. The user can effectively manage his entire aircraft portfolio from his own desktop with just a few mouse clicks. After a quick login procedure, the user simply enters an aircraft or engine serial number and current, comprehensive data is readily available.

If the logged-on user needs a photograph, he can simply click on the photo gallery. It is also possible for the user to compare various aircraft. This system is enabled with various search features that allow a vast variety of searches.

Access security is also an important aspect of the system. Enhanced security measures allow the user to control data access, granting viewer permissions to his clients, potential buyers, brokers, or lessees. Security passwords can be easily generated from the user's desktop, authorizing time limited or unlimited access, from one day to two weeks, for example, or limited access to only a portion of the records.

Due to the fact that the first embodiment of the novel system is a network-based system—preferably an Web-based system—the system is available 24 hours a day. Concise up-to-date data are readily accessible, without the need to learn or maintain complicated software and without software maintenance fees or glitches to repair. This ease of use means that data can be monitored by aircraft owners and edited or updated in-house, by lessees or debtors.

The system according to the invention simplifies document management, from reliable, timely document distribution, to secure, speedy records research. Accessing the Internet based system, the user experiences immediate, and convenient access to historical aircraft records and portfolio management tools. Similarly, the standalone version also provides very quick search capability with superior search result accuracy.

As noted above, records research is an important and costly endeavor. It is no longer necessary to spend countless hours to track down and then wade through the paper files. The ease and the reliability of accessing these archives over the Internet or through a CD or DVD drive on the user's computer is immediately apparent. A few simple clicks, and essential documents, once difficult to locate, are delivered and sorted for viewing on the desktop screen. On specifying key words or phrases, the search tool of the novel system nearly instantly displays archived documents matching the query. Faster and more efficient records research is thus enabled. The system thus reduces inspection fees, document distribution and storage costs.

Other features which are considered as characteristic for the invention are set forth in the appended claims.

Although the invention is illustrated and described herein as embodied in a method and system for aircraft data and portfolio management, it is nevertheless not intended to be limited to the details shown, since various modifications and structural changes may be made therein without departing from the spirit of the invention and within the scope and range of equivalents of the claims.

The construction of the invention, however, together with additional objects and advantages thereof will be best understood from the following description of the specific embodiment when read in connection with the accompanying drawings.

DESCRIPTION OF THE PREFERRED EMBODIMENTS

Figure 1:
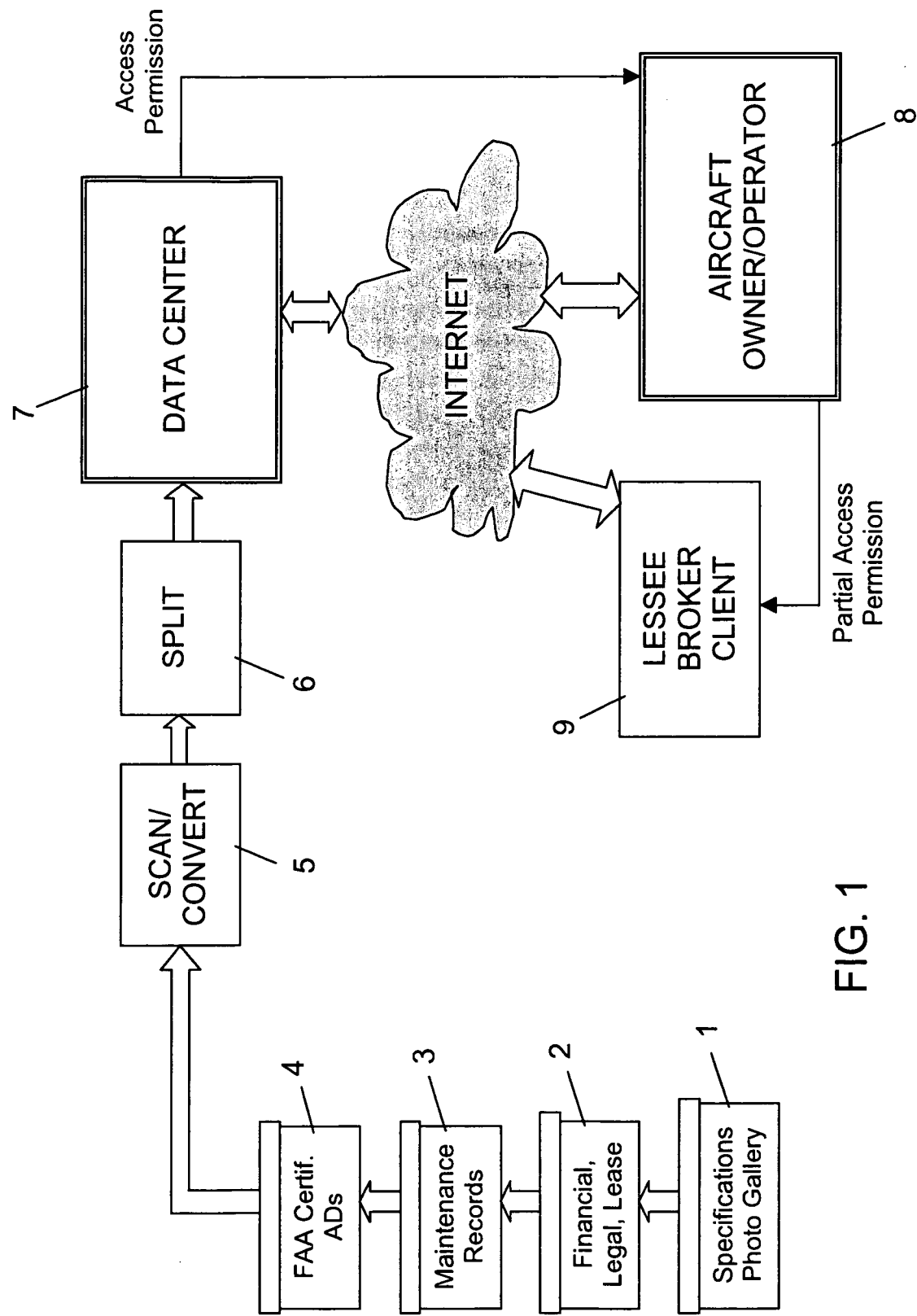
FIG. 1 is a block diagram illustrating a web-based embodiment of the system according to the invention.

Referring now to the figures of the drawing in detail and first, particularly, to FIG. 1 thereof, there is seen a diagrammatic overview over a first embodiment of the system according to the invention. The raw data records—typically in paper and microfiche form—are illustrated in several boxes 1, 2, 3, 4 on the left-hand side of the figure. The file with maintenance records and inspection records 2 will likely take up most of the space. In a first processing step, the documents are scanned to portable document format (PDF) and subjected to optical character recognition (OCR) in a system box 5. The output files generated by the scan and convert box 5 are text-searchable PDF files. The individual files are then renamed, split, and distributed in a logical tree structure in a system box 6. The files are then available in a central data center 7 within a hierarchically organized directory structure.

Once the files are organized in the data center 7, the owner/operator 8 is given permission to access the files. This is typically a full access to all of the pertinent files that pertain to the specific aircraft or, in the case of a multi-aircraft client, to all of the aircraft belonging to that specific owner/operator 8.

The owner/operator 8 may also give out sub-permission. For instance, if the aircraft is for sale, he may grant an interested party 9 a few days access to the pertinent files. That is, the sub-permit may be time-limited and it may grant access to only certain sub-directories. The owner/operator 8 is enabled by the system to organize his sub-permits either at the root directory level (full access) or at a subdirectory level (limited access). The data center keeps detailed logs listing access by user name, status, password, security group, and client association. In a related aspect, the system also provides for user administration, including e-mail notification, company filter, permission copy feature, and user activity logs.

The system box 5 may pertain to the database operator, i.e., the scanning and OCR conversion may be effected in-house, or it may represent an outsourced service. The specific technology used is not important. A vast number of scanners are available for capturing the paper record or the microfiche record. Similarly, many OCR programs are available that will provide satisfactory results, namely, to provide PDF files that are viewed as a graphical image, but the text of which is text-searchable.

The system box 6 pertains to a system-internal process, as the splitting, renaming, and organization operation requires considerably more brain power. Much of this brain power is provided, in our novel system, by a software program entitled DocuSearch.

In its preferred implementation, the program includes two primary applications. The first application pertains to the box 6 (DocuSearch Creator) as it prepares the data for the searchable database, and the actual search and data management (DocuSearch) in the database system.

The first application enables the system operator to create searchable aircraft-related documents in Adobe® PDF format. These documents are organized into a virtual categorized tree structure. After the documents have been scanned and OCRed, the records are separated into smaller, directory-ready or CD-ROM ready files with auto-generated numerical file extensions.

Prior to organizing and dropping the scanned files into the tree-organized database, the system operator launches a program routine using an SQL server to connect to the main database system. After successful connection the program presents a list of aircraft from the database. The user makes an aircraft selection to display a tree directory of folders containing applicable PDF documents. This virtual tree requires a connection to the main database where the documents are located. Users can add, delete, rename, view and sort folders and PDF files contained within the folders.

In a preferred implementation of the invention, the data are read from the scanned PDF files using Adobe® PDF Library (a free SDK—software development kit). The DocuSearch Creator captures and catalogs the data from the PDF files and stores the data into the main database.

Folders can also be created from the physical directory structure. The user selects a physical directory on the local hard drive or any network drive where folders and files are stored. This fully automated process replicates the entire virtual structure in the database.

The second part of the data management program is entitled DocuSearch. This application is designed to simplify records research for the authorized user. The users navigate folders containing aircraft records or search for particular file documents by keyword or a phrase.

This software program has two versions, namely, a run-time or stand-alone version that runs on the user's computer (the disk-based version) and a web-based version.

In a search, the user inputs a keyword or a phrase into the search textbox. The application searches within the main database for any matching occurrences and lists and sorts matching results by directory or by a disk (CD) number. Listed by file name, number of occurrences in pages and the disk number, search results indicate where matching documents can be found. The user then double clicks on the matching file to open it in a view mode. The display then shows the scanned document in a full graphical view. In addition, the document may also be searched for the occurrence of a given text string. A Find Next button is clicked to display the next page from the matching list. Along with the matching document, the application displays the number of keyword occurrences on the current page. In addition, it is also possible to highlight each occurrence.

Figure 2:
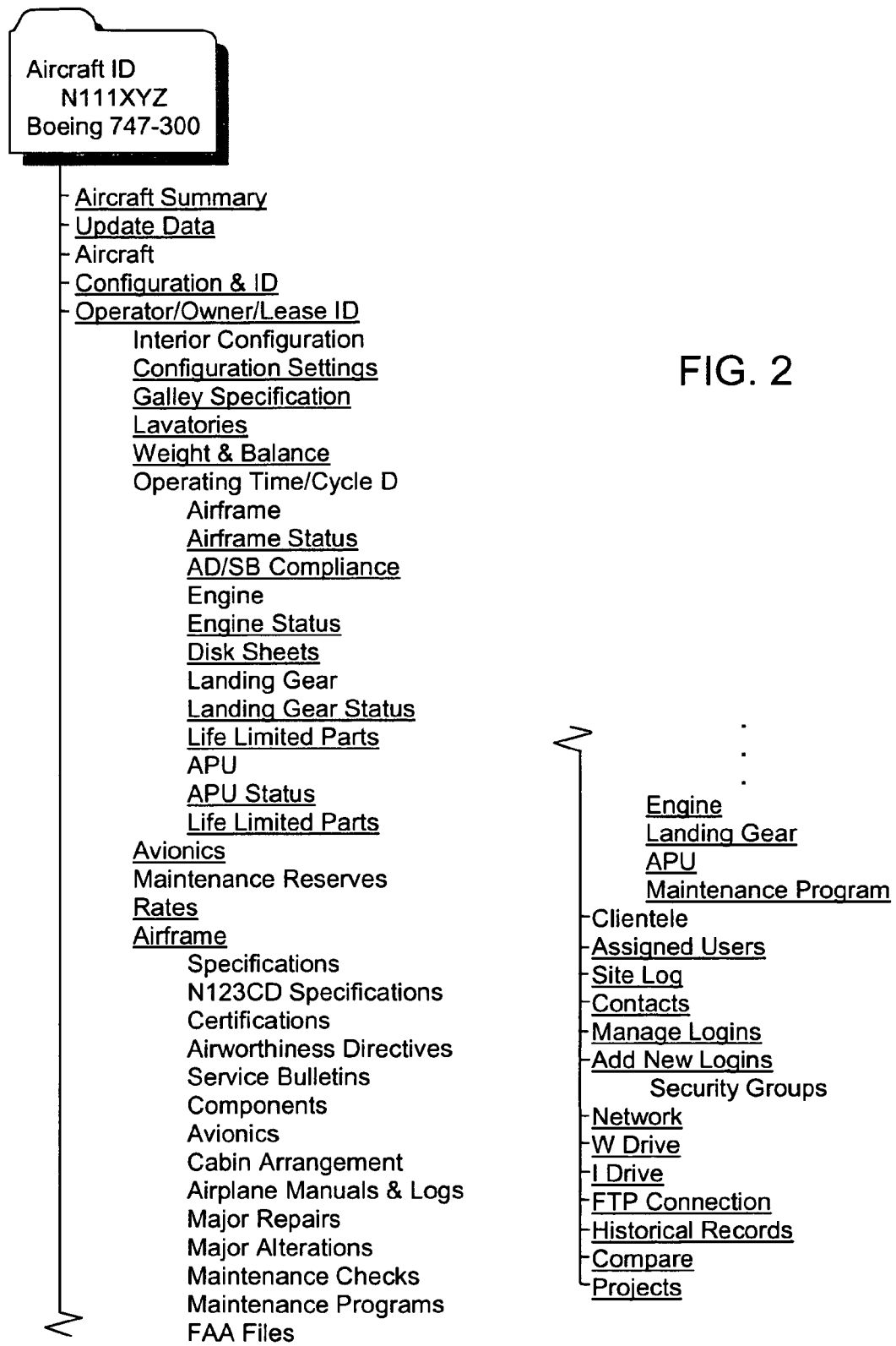
FIG. 2 is a diagrammatic view of an exemplary tree structure for a single air-craft directory.

A program subroutine allows the user access to any authorized file within the tree structure (created by the above-mentioned DocuSearch Creator). An exemplary tree structure is shown in FIG. 2. The specific tree structure pertains to a US-registered Boeing 747-300. Users collapse or expand folders by clicking plus or minus symbols to navigate the complete directory of files. Files are made viewable by double clicking the PDF icon in the DocuSearch tree structure.

In order to streamline and simplify research, there is provided a history dropdown list. This feature may be made available in both the online and off-line version, but it is especially advantageous in the off-line version. The user's file navigation is recorded (e.g., by file name), and stored in a dropdown list. The file history is available for quick access to previously viewed files.

In its first implementation, the novel portfolio management system is Web-based. As such, the user does not require any special software installation, except for a web browser and a PDF Acrobat Viewer. The user logs onto the online system by entering a user name and a password provided by the system operator.

Upon login, site navigation is located in a navigation window showing the main directories with forms, historical records, and other aircraft management tools. Users may collapse/expand menu categories for access, as well as sort, search and view documents in the PDF format.

The user—or a further user given sub-permission—may perform complete remote inspections or comparisons of aircraft, engine, APU, and other applicable aircraft data. The application allows instant electronic file distribution of aircraft records. Depending on the security level, or permission level given to the further user, he may be assigned access to specified folder(s) of documents in the tree structure, such as to all of the maintenance records concerning the engines, for example, or all of the financial documentation.

In the disk-based or stand-alone embodiment of the invention, the user requires a browser and a full version of Adobe® Acrobat® (version 5.0 or higher).

Figure 3:
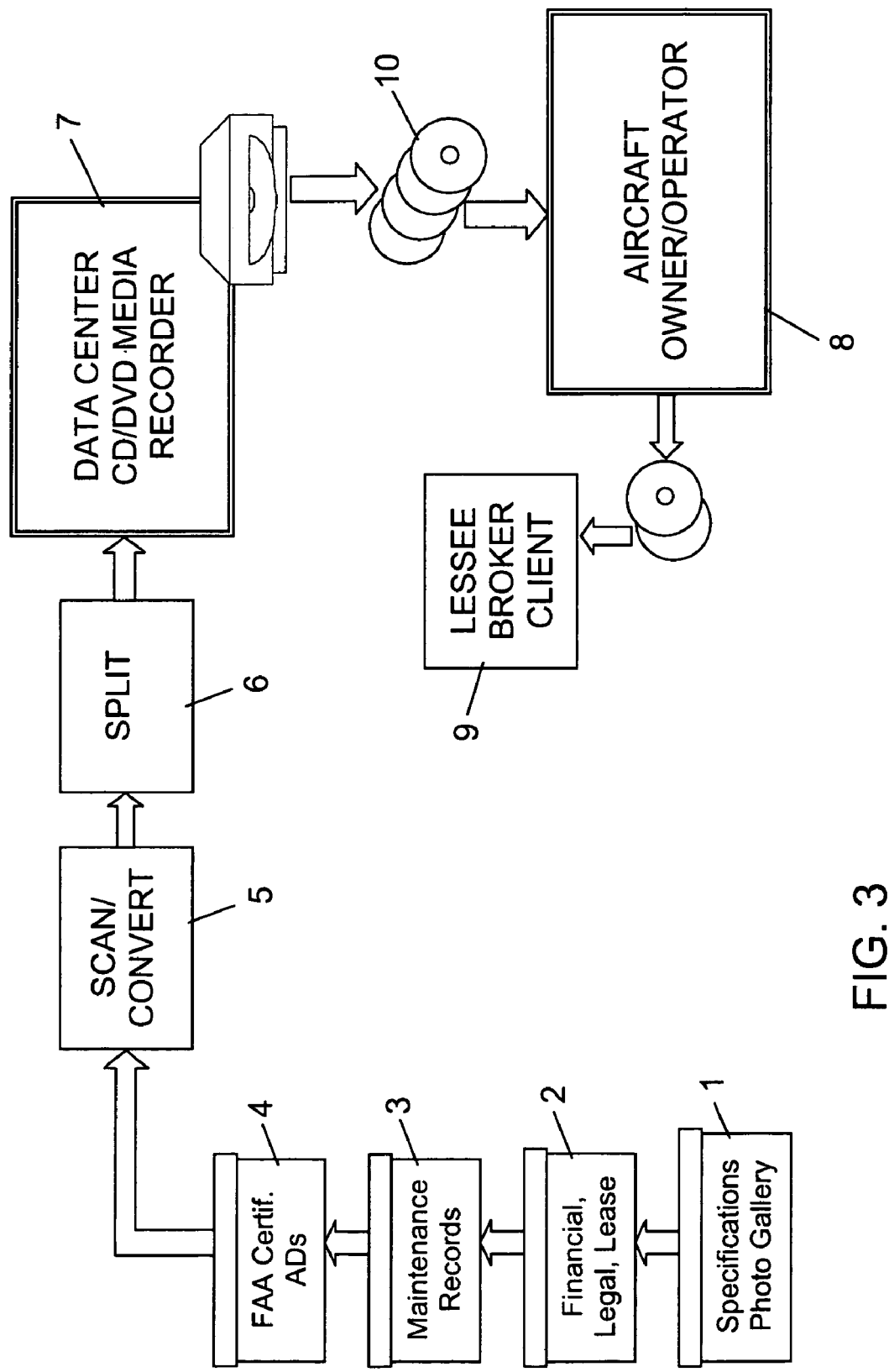
FIG. 3 is a block diagram illustrating a stand-alone, or disk-based embodiment of the system according to the invention.

In the setup and preparatory process, the disk-based system illustrated in FIG. 3 is identical with the web-based system of FIG. 1. The records are shipped to the system operator in paper format, microfiche format, or any other documentation format, in the boxes 1-4. The records are scanned or similarly input and converted into portable document PDF format, i.e., into the virtual domain. Next, the record files are split into categorical order or separated into smaller files in system box 6. Similarly to the above description, this is once more effected with the aid of the program DocuSearch Creator.

Next, the document files—now sorted and organized in a tree structure similar to the one shown in FIG. 2—are copied onto a portable data carrier 10. In the preferred embodiment, the portable data carrier is in the form of one or more CDs or one or more DVDs. The amount of data on the data carrier 10 is typically in the range of a few gigabytes, such as 3 to 4 GB for the above-mentioned Boeing 737 which, at the beginning of the process, was documented on approximately 80,000 pages in 40 boxes. This data volume, therefore, requires about five CDs or a single DVD. It will be understood that other data carriers, or computer-readable media, are available and fall within the scope of the invention. The term computer-readable medium, therefore, includes all computer memory and carriers such as floppy disks, hard disks, CD-ROMs, Flash ROMs, media cards, non-volatile ROM, and RAM. Also included are electromagnetic carrier waves for transmitting data.

The latter example of a computer-readable medium refers to a stand-alone embodiment of the invention, in which the required data files are downloaded to the aircraft operator's computer 8 through a network (e.g., the Internet). Once the data transfer is complete, the aircraft portfolio management system is operated in stand-alone or off-line mode. This, then, is the disk-based version of the system in which the data are transmitted to the user's computer.

We claim:

1. A computer-based system providing a method of managing aircraft-related records, the method which comprises:
   (a) entering information to identify a unique aircraft into the system;
   (b) automatically generating a unique aircraft identifier for said unique aircraft, by said system;
   (c) collecting physical and electronic data records pertaining to said unique aircraft;
   (d) scanning the physical data records into a computer system and converting the data into files having a computer-searchable format;
   (e) sorting said converted data files by said unique aircraft identifier;
   (f) creation of a secure access relationship between said records of said unique aircraft and initiating said secure access relationship by creation of a Base 64 encrypted password by creating a password KEY followed by creation of corresponding initialization vector; and (g) providing user access to said secure access relationship through said to the virtual aircraft records with access permission tagged to said records of said unique aircraft.

2. The method according to claim 1, wherein the virtual aircraft records are stored on a web server, and a user having permission to access the virtual aircraft records is enabled to gain access through the Internet with a computer running a web browser.

3. The method according to claim 1, wherein the step of providing user access comprises copying the virtual aircraft records onto a portable data carrier with computer-readable files and transferring the portable data carrier to the user.

4. The method according to claim 1, wherein the converting step comprises subjecting scanned records to optical character recognition and outputting files in text-searchable format.

5. The method according to claim 1, which further comprises entering pictures and graphical files into the database system and making available the pictures and graphical files pertaining to the given aircraft upon user request through the network.

6. The method according to claim 1, wherein said user access to the virtual aircraft records is for a specific aircraft group.

7. A computer-readable medium having stored thereon computer-readable data pertaining to an aircraft records portfolio, comprising: files containing graphical data of scanned paper records of the records portfolio of a given aircraft for display on a computer screen showing the records in graphical format and having text information of the paper records in text-searchable format; and data files with photographic information related to the given aircraft, scanning the said graphical and data records into a computer system, converting said scanned records into files having a computer-searchable format; sorting said scanned records such that the are accessible and searchable by a unique aircraft identifier.

8. A set of application program interfaces embodied on a computer-readable medium for execution on a computer having an application program for identifying and displaying specific aircraft portfolio information to an interested person, comprising: a login interface enabling or denying access to a data set with a specific aircraft records portfolio based on a unique aircraft identifier; a search query interface receiving a set of search attributes; a search engine matching the set of search attributes with each occurrence of the search attributes in the data set with said aircraft records portfolio, and an interface returning and displaying a list of resulting matches corresponding to a unique aircraft identifier; and a display interface, responsive to a selection by the user from the list of resulting matches, for displaying matching data from the aircraft portfolio in graphical display format.

9. The set of application program interfaces according to claim 8, wherein the data set is comprised of text-searchable records generated by scanning paper records and optical character recognition.

* * * * *